United States Patent [19] [11] 3,756,199
Clark, IV [45] Sept. 4, 1973

[54] ANIMAL OPERATED WATERING DEVICE
[75] Inventor: Reuben B. Clark, IV, Daylesford, Pa.
[73] Assignee: Fox Products Company, Philadelphia, Pa.
[22] Filed: Apr. 17, 1972
[21] Appl. No.: 244,461

[52] U.S. Cl. .............................................. 119/72.5
[51] Int. Cl. .................................................. A01k 7/00
[58] Field of Search .............................. 119/72.5, 75

[56] References Cited
UNITED STATES PATENTS
3,602,197  8/1971  Fioretto ............................. 119/72.5
3,550,560  12/1970  Eostrom ............................. 119/72.5

Primary Examiner—Robert Peshock
Assistant Examiner—J. A. Oliff
Attorney—D. C. Roylance et al.

[57] ABSTRACT

Animal operated watering device of the "nipple valve" type in which the movable valve element is in the form of a thin flat disc of elastomeric material and the device is so constructed and arranged as to be actuatable by tilting of the valve operating member as well as to upward movement thereof.

4 Claims, 6 Drawing Figures

PATENTED SEP 4 1973  3,756,199
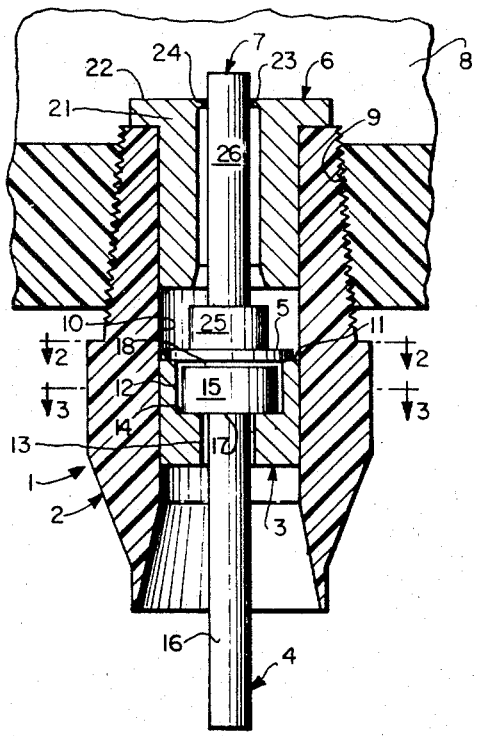
FIG. 1
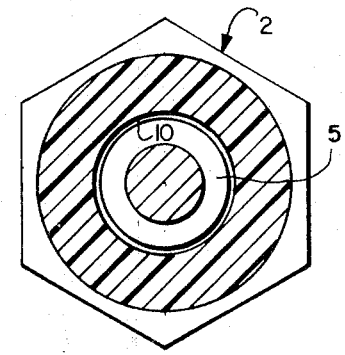
FIG. 2
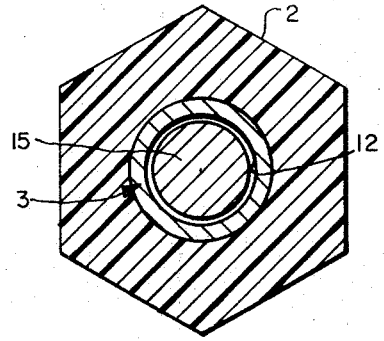
FIG. 3
FIG. 4
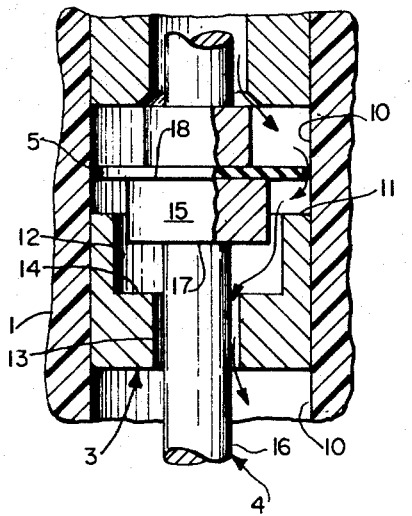
FIG. 5
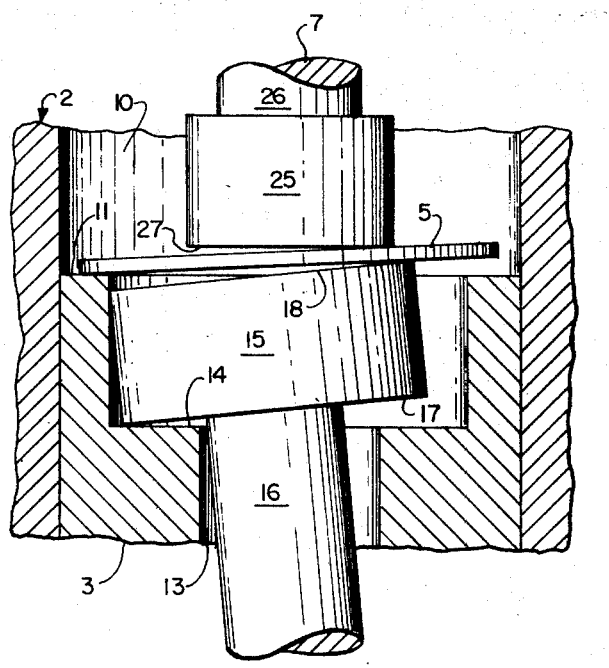
FIG. 6 ed States Patent 3,756,199

ANIMAL OPERATED WATERING DEVICE

BACKGROUND OF THE INVENTION

Many poultry growers have long preferred to employ waterers of the general type employing a water supply member, usually a long conduit arranged generally horizontally, to which are attached a plurality of valves which can be operated by the birds to provide a small quantity of water whenever the bird pushes with its beak on the operating member of the valve. Commonly referred to as nipple valves, the valves for such waterers are quite small, typically on the order of 1 in. in maximum dimension, the small size being dictated by the inherent dimensional parameters of the watering system. Though prior-art workers have given much attention to such waterers, a number of problems, which stem particularly from the small size of the valve and the relatively low hydrostatic heads available in such systems, have seriously limited the success of such devices.

To be truly satisfactory, such waterers must be inexpensive, dependably operable by the birds to be watered, essentially free from tendencies to clog or stick as a result of foreign matter in the water, and capable of providing a relatively constant low "fully open" flow over a fairly wide range of hydrostatic head values. Typically, such devices should exhibit a fully open flow of 2-5 oz. per min. over a range of hydrostatic head values up to 6 ft. And the device must be easily operated, by the beak of the bird, to provide water, yet must close positively and dependably each time the bird withdraws its beak, such a closure depending upon hydrostatic forces aided by the small weight of the movable portions of the device. Since such weight is on the order of 1-2 grams, a typical diameter for a valve seat of such devices is less than 0.1 in., and the manufacturer's price for the valve should be less than 25 cents it will be recognized that the problems of satisfying the needs of poultry growers desiring to use such waterers are severe.

Prior-art workers have proposed many watering devices of this general type, the state of the art being indicated by U.S. Pat. Nos. 1,918,566, 2,307,220, 2,541,369, 2,851,007, 3,128,745 and 3,418,977, French Pat. No. 1,512,977 and German Utility Model No. 6,914,521. Though such devices have achieved commercial acceptance to a considerable extent, the need for lower cost of manufacture and increased dependability in operation, with particular emphasis on positive closing of the valve over long periods of use despite the low hydrostatic heads involved, have presented a continuing need for improvement.

OBJECTS OF THE INVENTION

A general object of the invention is to devise a watering device of the type described which can be manufactured at lower cost than the prior-art devices, yet is dependably operable over long periods of use even when water is supplied to the valve under hydrostatic heads of 1 ft. or less.

Another object is to provide such a valve embodying a very simple movable valve element which can be manufactured satisfactorily despite its very small size.

A further object is to devise a poultry waterer of the nipple valve type which will be dependably operable under conditions where other valves have been defeated by dirt particles and the like.

SUMMARY OF THE INVENTION

Watering devices according to the invention comprise a generally tubular upright body with a transverse annular fixed valve seat located intermediate the ends thereof; a movable valve element in the form of a thin flat disc of polymeric material located above the valve seat, there being a passage portion below the valve seat which opens upwardly therethrough and which has a transverse annular upwardly facing shoulder therebelow; a valve operating member comprising an enlarged head portion disposed in the passage portion below the seat and a stem portion extending downwardly below the body; and combined flow restrictor and filter means located in the body means at a location spaced above the movable valve member. Advantageously, the restrictor and filter means includes a movable member having an enlarged head portion, engaged with the upper face of the valve element disc, and an elongated stem projecting upwardly to pass freely through an inlet orifice provided by a fixed restrictor member at the upper end of the body. The thin valve element disc is then engaged between the respective head portions of the operating member and the movable restrictor member whenever the operating member is manipulated to open the valve.

In order that the manner in which the foregoing and other objects are achieved according to the invention can be understood in detail, a particularly advantageous embodiment thereof will be described with reference to the accompanying drawings, which form part of the original disclosure of this application, and wherein:

FIG. 1 is a vertical sectional view, with some parts shown in side elevation, of a poultry watering device according to the invention;

FIGS. 2 and 3 are transverse sectional views taken respectively on lines 2—2 and 3—3, FIG. 1;

FIG. 4 is a fragmentary vertical sectional view showing a modified form of body means useful in the device of FIG. 1;

FIG. 5 is a fragmentary vertical sectional view showing movable parts of the device of FIG. 1 in a "valve open" position; and FIG. 6 is a view similar to FIG. 5 but showing the movable parts in another valve open position.

DETAILED DESCRIPTION

Referring to FIGS. 1-3 of the drawings, the illustrated embodiment of the invention comprises a body means, indicated generally at 1 and including the tubular main body 2 and a valve seat member 3; a movable valve operating member 4; a movable valve element 5; and restrictor means comprising an annular restrictor member 6 and a movable restrictor member 7. Body 2 defines a through passage and is constructed to be secured in upright position to a hollow water supply member, such as a substantially horizontal pipe 8, FIG. 1, with the upper end of the through passage communicating with the interior of the water supply member and the lower end of the passage located outside of and below the water supply member. Typically, body 2 is sealingly engaged in an opening 9, FIG. 1, in the supply member and can be secured by threads, as indicated in FIG. 1, or by other suitable means.

In this embodiment, body 2 is of rigid polymeric material, the through passage includes a right cylindrical portion 10, FIG. 1, which extends from the upper end of the body downwardly through most of the length of the body, and the seat member 3 is an annular metal member engaged in the cylindrical passage portion 10, as by a press fit. Seat member 3 presents a flat transverse annular valve seat 11 which faces toward the upper end of the body, is radially relatively narrow, and which lies immediately adjacent to the wall of cylindrical passage portion 10. Seat member 3 defines a first lower passage portion 12 and a second lower passage portion 13, both being bounded by right cylindrical walls which are mutually coaxial and also coaxial with passage portion 10. The first lower passage portion 12 opens upwardly through valve seat 11, the upper end of passage portion 12 defining the central opening of valve seat 11. The second lower passage portion 13 is of significantly smaller diameter than passage portion 12 and joins that passage portion at a transverse annular upwardly facing shoulder 14.

Operating member 4 is of metal and comprises an enlarged right cylindrical head portion 15 and an elongated cylindrical stem portion 16. Head portion 15 has a diameter slightly smaller than that of the first lower passage portion 12. The diameter of stem portion 16 is slightly smaller than that of the second lower passage portion 13. Head portion 15 presents a flat transverse annular downwardly facing shoulder 17 capable of flush engagement with shoulder 14. The axial length of head portion 15 is slightly less than that of the first lower passage portion 12 so that, when shoulder 17 engages shoulder 14, the flat upper face 18 of head portion 15 is slightly below the plane of valve seat 11. The length of stem portion 16 is such that, when shoulder 17 is engaged with shoulder 14, stem portion 16 projects well beyond the lower end of body 2.

Movable valve element 5 is in the form of a thin flat circular disc of polymeric material. For best results, disc 5 is formed of elastomeric material, silicone rubber having a Durometer of about 25 being particularly advantageous. In a device in which body 2 is, e.g., ¾ inch in length, disc 5 can be approximately 1/32 inch in thickness and have a typical diameter of about 3/16 inch. Disc 5 can be considered as a wafer which can be produced simply by being sliced from the end of a cylindrical rod of silicone rubber. Thus, the discs can be produced very rapidly and at minimum cost, yet will be within closely held dimensional tolerance.

Seat member 3 is located intermediate the ends of the through passage defined by body 2 and occupies a position such that a major portion of right cylindrical passage portion 10 is above valve seat 11. The fixed restrictor member 6 is inserted into the upper end of the through passage and comprises a tubular main body 21 and a transverse annular outwardly projecting end flange 22, body 21 being embraced by the wall of passage 10 in press fit relation, and flange 22 being in flush engagement with the upper end face of body 2. Member 6 also includes a transverse annular inwardly projecting flange 23, the upper face of which is a continuation of the transverse end surface presented by flange 22. Flange 23 defines a short right cylindrical surface 24. Below flange 23, body 21 defines a cylindrical passage portion which has a diameter significantly larger than that of surface 24. At its lower end, the internal wall of body 21 is outwardly flared, opening into the enlarged chamber defined by the cylindrical wall of passage portion 10 between members 3 and 6.

Movable restrictor member 7 is of metal and includes an enlarged right cylindrical head portion 25 and an elongated cylindrical stem portion 26, head portion 25 being located between movable valve element 5 and the lower end of body 21, and stem portion 26 extending upwardly through member 6. Head portion 25 has a flat lower face 27, FIG. 6, is of smaller diameter than head portion 15 of member 4, and has an axial length which is shorter than the axial space between valve seat 11 and the lower end of body 21 by 2-3 times the thickness of valve element 5. Accordingly, when surface 27 of head portion 25 is engaged with the upper face of valve element 5, the combination of valve element 5 and head portion 25 of restrictor member 7 can be moved upwardly, away from valve seat 11, a substantial distance before head portion 25 engages the fixed restrictor member 6.

The diameter of cylindrical surface 24 is only slightly larger than that of stem portion 26 so that, though stem portion 26 passes freely through the opening defined by surface portion 24, there is only a small clearance. Thus, the difference between the two diameters can be in the range of 0.004-0.01 in. Accordingly, the combination of elements 6 and 7 serves not only to restrict the flow through the device to a predetermined small value but also as a self-cleaning filter to prevent fouling of the device.

As shown in FIG. 4, the valve seat member can be integral with the body, so that seat 11a is then of the same rigid polymeric material as is the remainder of body 2a.

Advantageously, elements 4 and 7 are of stainless steel, with head portions 15 and 25 formed very inexpensively by conventional cold forming techniques. Body 2 can be of any rigid polymeric material having low water absorption characteristics and high dimensional stability. Assuming that body 2 is formed from a polymeric material having low friction characteristics, the fixed restrictor member 6 can be of the same material. Alternately, member 6 can be of brass.

OPERATION

In a typical installation, the water supply member 8 can be a substantially horizontal pipe connected to a source of water such that the level of water is maintained above the upper end face of member 6. When a bird pushes upwardly on stem portion 16 of member 4, member 4 is moved upwardly relative to seat member 3 so that, as will be clear from FIG. 5, the upper face of head portion 15 comes into engagement with the lower surface of the central portion of valve element 5. At this stage, valve element 5 is engaged between head portion 15 of member 4 and head portion 25 of member 7. Further upward movement of member 4 causes the combination of element 5 and member 7 to move upwardly so that the valve element 5 is displaced upwardly from seat 11. Water from pipe 8 having entered via the annular space between surface 24 and stem portion 26, there will be a flow as indicated by the arrows in FIG. 5. Thus, water flows downwardly around the periphery of valve element 5 and successively through the passage portions 12 and 13. Since there are only small clearances between head portion 15 and the surrounding wall of passage portion 12, and between stem 16 and the surrounding wall of passage portion 13, only a small amount of water is allowed to flow through member 3, and this small amount tends to trickle down the surface of stem 16, thus being presented to the bird.

If, instead of pushing member 4 upwardly, the bird pushes laterally on stem 16, member 4 will be tilted relative to seat member 3, so that the upper face 18, FIG. 6, of head portion 15 is tilted into engagement with the lower face of the valve element 5. Valve element 5 is accordingly tilted upwardly, opening the valve to downward water flow in the manner indicated by the arrows in FIG. 6.

What is claimed is:

1. In an animal operated watering device, the combination of
   body means defining a through passage having an inlet end and an outlet end, the body means being adapted to be secured to a hollow water supply member with said inlet end communicating with the interior of the water supply member and said through passage extending vertically,
   an intermediate portion of said body means defining a transverse annular valve seat which faces toward said inlet end,
   the portion of said body means between said valve seat and said outlet end defining a first portion of said through passage adjacent said seat and a second portion of said through passage which extends from said first passage portion toward said outlet end, said first passage portion being of larger transverse dimension than said second passage portion and said first and second passage portions joining at a transverse annular shoulder which faces toward said inlet end;
   a movable valve operating member having an enlarged head portion located in said first passage portion and a stem portion extending through said second passage portion and projecting beyond said outlet end,
   the axial dimension of said head portion not exceeding the axial length of said first passage portion, and the transverse dimension of said head portion being smaller than that of said first passage portion, there being an annular space between said operating member and the surrounding wall of said through passage through which water can flow when said head portion of said operating member is displaced from said shoulder;
   a freely movable valve element in the form of a thin flat disc of polymeric material located in said through passage adjacent said seat,
   said disc extending completely across the opening defined by said seat;
   tubular restrictor means located in said through passage adjacent said inlet end thereof,
   said restrictor means defining an aperture which is axially aligned with the opening defined by said seat; and
   a movable member located in the portion of said through passage between said valve element and said inlet end,
   said last-mentioned movable member having a head end disposed to engage the side of said disc opposite said seat, and a stem projecting through the aperture defined by said restrictor means, there being a small clearance between the stem of the last mentioned movable member and the wall of said aperture.

2. A watering device according to claim 1, wherein said head end of said last-mentioned movable member is enlarged and said tubular restrictor means and said last-mentioned movable member have cooperating stop surfaces to limit movement of said last-mentioned movable member away from said valve element.

3. A watering device according to claim 1, wherein said intermediate portion of said body means is of metal, and
said disc is of elastomeric material.

4. A watering device according to claim 1, wherein said body means is formed as a single piece of rigid polymeric material, said intermediate portion being integral therewith, and
said disc is of elastomeric material.

* * * * *